Nov. 3, 1925.

C. B. LANSING 1,559,894

PORTABLE PNEUMATIC GREASE GUN

Filed Dec. 26, 1924

INVENTOR
C. B. Lansing
BY
ATTORNEYS

Patented Nov. 3, 1925.

1,559,894

UNITED STATES PATENT OFFICE.

CHARLES BRIDGEN LANSING, OF COLORADO SPRINGS, COLORADO.

PORTABLE PNEUMATIC GREASE GUN.

Application filed December 26, 1924. Serial No. 758,211.

*To all whom it may concern:*

Be it known that I, CHARLES BRIDGEN LANSING, a citizen of the United States, and a resident of Colorado Springs, in the county of El Paso and State of Colorado, have invented a new and useful Improvement in Portable Pneumatic Grease Guns, of which the following is a full, clear, and exact description.

My invention relates to improvements in pneumatic grease guns, and it consists in the combinations, constructions, and arrangements herein described and claimed.

An object of my invention is to provide a pneumatic grease gun of the character described by means of which grease initially passed into a conducting passage is forced, under pressure, through said passage and into a grease cup or the like with which said passage is adapted for connection.

A further object of my invention is to provide a pneumatic grease gun of the character described by means of which the amount of grease forced into the grease cup or grease passage may be accurately determined.

A further object of my invention is to provide a grease gun of the character described by means of which great force may be applied to the grease, thus assuring its movement to remote portions of the bearing or mechanism sought to be lubricated.

A further object of my invention is to provide a pneumatic grease gun of the character described which may be readily refilled without disconnecting the gun from the source of air supply.

A further object of my invention is to provide a pneumatic grease gun of the character described which is light in weight, durable, and which is thoroughly practical for the purpose intended.

Other objects and advantages will appear in the following specification, and the novel features of the invention will be particularly pointed out in the appended claims.

Figure 1:
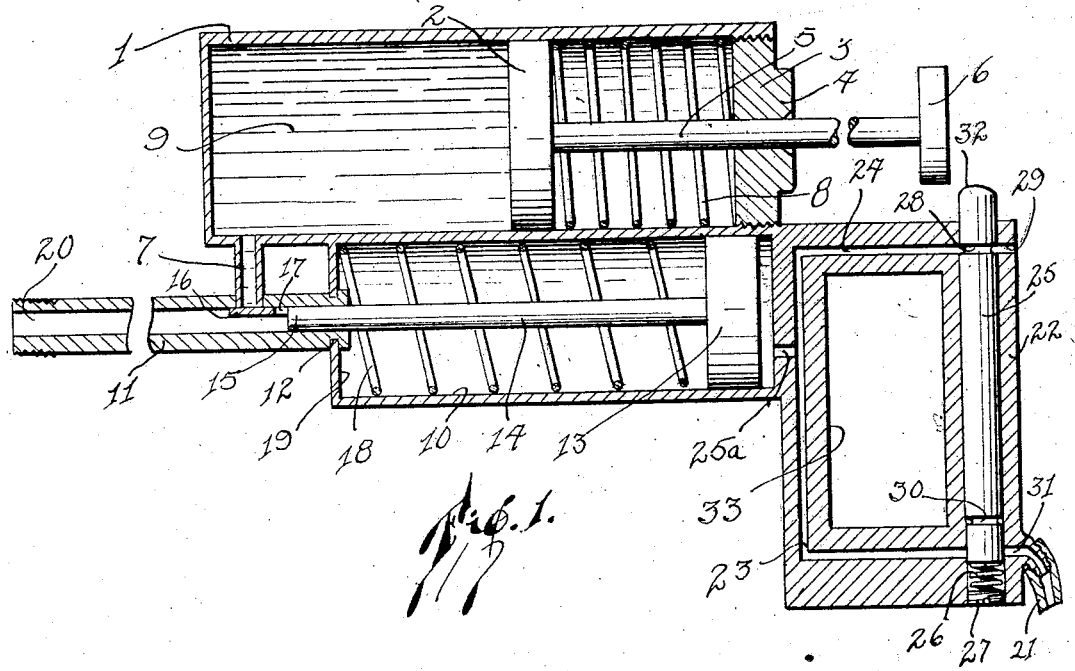
Figure 2:
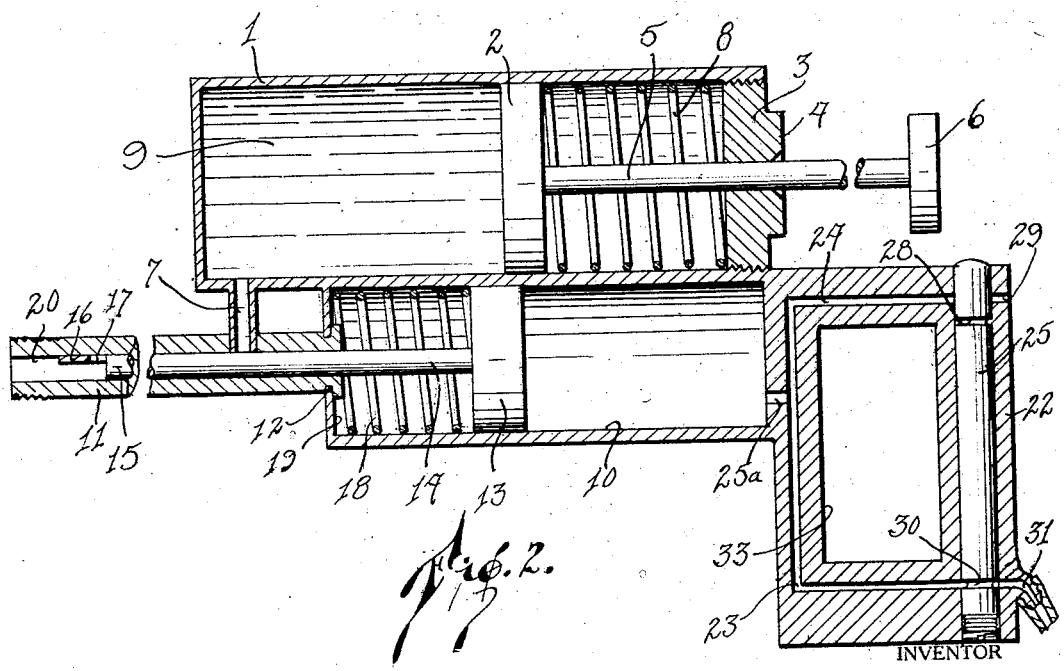

My invention is illustrated in the accompanying drawings forming part of this application, in which Figure 1 is a sectional view through an embodiment of my invention, and Figure 2 is a view of the mechanism illustrated in Figure 1 with the air valve open, as in operation.

In carrying out my invention I make use of a grease containing cylinder 1 having a piston 2 mounted for reciprocation therein. The cylinder 1 has a removable threaded plug 3 which serves as a closure for the outer end of the cylinder. This closure 3 is provided with a projection 4 by which it may be readily gripped with the wrench and removed from the cylinder.

The piston 2 is provided with a push rod 5 which is projected through the plug 3 and provided with a hand grip 6 at the outermost end thereof by means of which the grease may be manually forced if desired toward the inner end of the cylinder and out through a conducting tube 7 disposed at the inner end of the cylinder.

A compression spring 8 is disposed between the plug 3 and the piston 2 concentric with the push rod 5, so as to maintain a heavy lubricant such as grease 9 under slight pressure in the cylinder.

An air cylinder 10 is fixed to the cylinder 1 with its axis parallel thereto. The cylinder 10 is slightly shorter than the cylinder 1 and of lesser diameter. A tubular member 11 or passage member is connected at one end 12 with the outer end of the cylinder 10. The axis of the member 11 is in registration with the axis of the cylinder 10.

The conducting tube 7 is connected at its outer end with the passage member 11 at a point intermediate the length of the member 11, whereby grease 9 may be forced into the passage member 11 due to pressure of the spring 8. A piston 13 is disposed within the air cylinder 10 and has a plunger 14 secured thereto which extends into the passage member 11. The outermost end 15 of the plunger 14 is provided with a lip 16 which normally closes the mouth of the tubular conductor 7 when the piston is in a fully retracted position, as shown in Figure 1.

The lip 16 has a slot 17 therethrough, by means of which grease may enter the passage 11 just prior to the piston 13 reaching its fully retracted position. A compression spring 18 is disposed concentric with the plunger 14 between the piston 13 and the inner wall 19 of the cylinder 10 whereby the piston 13 is yieldingly held in the position shown in Figure 1. Means for forcing the piston 13 toward the outer end of the cylinder, and thus forcing grease, then disposed in the passage 11, out through the mouth 20 of the passage 11 is provided by admitting compressed air through the flexible tube 21 to a valve body member 22. This valve body member has two principal passages therethrough an inlet passage 23 and a discharge passage 24, both communicating with the cylinder 10 by means of a common passage 25ª.

A plunger valve 25 is carried by the body member 22, and is normally held in the position shown in Figure 1 by means of a compression spring 26 passed beneath the plunger and adjusted for pressure by the provision of a threaded plug 27.

The plunger valve 25 has an annular recess on its peripheral wall shown at 28 at the upper end, which is in registration with the passage 24 and the discharge port 29, when the device is in the position shown in Figure 1.

The plunger 25 has a second annular recess 30, similar to the recess 28, adjacent to the lower end which may be moved into registration with the passage 23 and a passage 31 communicating with the tube 21 when the plunger 25 is moved downwardly against the force of the spring 26. When such movement occurs, the discharge passage 24 is closed by virtue of downward movement of that part of the plunger containing the recess 28.

The plunger 25 extends above the valve member 22 as shown at 32, thereby facilitating manual operation of the valve plunger. The valve member 22 has a central opening 33 therethrough, thereby providing a convenient means for holding the entire device by means of the valve member as a handle.

From the foregoing description of the various parts of the device, the operation thereof may be readily understood. Prior to using my improved grease gun, it is necessary to fill the cylinder 1 with grease 9. This is done by removal of the plug 3, and the piston 2.

The air tube 21 is then connected with the valve member 22, as shown in Figure 1. Pressure is applied to the valve 25 so as to move the recess 30 in registration with the passage 23—31. Thus air may enter the cylinder 10 and force the piston toward the outer end of the cylinder. Movement of the plunger 14 by virtue of movement of the plunger 13 will cause the slot 17 of the lip 16 to register with the conducting member 7 and grease 9 to be admitted to the passage 11. The quantity of grease may be determined by the size of the spring 8 or by manipulating the valve plunger 25 so as to hold the plunger 14 in this position for a moment.

Continued pressure on the valve 25 will cause the piston 13 to move to the outer end of the cylinder 10 and the plunger 14 will force grease 9 in the passage 11 out through the mouth 20 and into the grease cup, receptacle, fixture or the like.

The pressure is then released from the valve 25, permitting registration of the recess 28 with the passage 24—29. This time the recess 30 is out of registration with the passage 23—31. The valve thus closes the latter passage.

The spring 18 is then free to force the piston 13 to the inner end of the cylinder 10 and air is expelled through the passage 24—29.

As the slot 17 comes into registration with the conducting member 7, fresh grease is admitted to the passage 11 and the device is ready for a second complete cycle of its operation.

I claim:

1. A pneumatic grease gun of the character described comprising a grease container, a passage member adapted for connection with a grease tube or the like communicating with said container at its remote end, an air cylinder, a piston in said air cylinder, a plunger carried by said piston and arranged for movement through said passage member, means for admitting compressed air to said cylinder for the actuation of said piston at will, and means associated with said plunger for stopping the flow of grease into said passage member when said piston is fully retracted and for permitting the movement of grease in said passageway when said piston is at a point near full retraction.

2. A pneumatic grease gun of the character described comprising a grease container, a passage member adapted for connection with a grease tube or the like, a conducting tube communicating with said grease container and with said passage member whereby grease may be conducted from said container to said passage member, a plunger slidably disposed in said passage member, a lip carried by said plunger at the outermost end thereof for normally closing the mouth of said conducting tube when said plunger is fully retracted thereby preventing the movement of grease into said passage member, said lip having an opening therethrough at the innermost end thereof, whereby grease may pass through said opening from said conducting tube when said plunger is slightly extended, and compressed air actuated means for moving said plunger at will thereby forcing grease in said passage member through said grease tube or the like.

3. A pneumatic grease gun of the character described comprising a grease container, a passage member adapted for connection with a grease tube or the like communicating with said container at its remote end, an air cylinder, a piston in said air cylinder, a plunger carried by said piston and arranged for movement through said passage member, means for admitting compressed air to said cylinder for the actuation of said piston at will, and means associated with said plunger for stopping the flow of grease into said passage member when said piston is fully retracted and for permitting the movement of grease into said passageway when said piston is at a point near full retraction, said means including a lip extending longitudinally from the outermost end of said plunger and having an opening therethrough at a point adjacent to the plunger.

CHARLES BRIDGEN LANSING.